United States Patent Office

2,959,603
Patented Nov. 8, 1960

2,959,603

TRIESTERS OF 9α-FLUORO-4-PREGNENE-11β,17α, 21-TRIOL-3,20-DIONE

David H. Gould, Leonia, and Elliot L. Shapiro, Irvington, N.J., assignors to Schering Corporation, Bloomfield, N.J., a corporation of New Jersey No Drawing. Filed Dec. 3, 1957, Ser. No. 700,305

3 Claims. (Cl. 260—397.45)

This invention relates to a new group of esterified pregnenes and to processes for their manufacture. More particularly, this invention relates to polyesters of 9α-halogeno-4-pregnene-17α,21-diol-3,11,20-trione and 9α-halogeno-4-pregnene-11β,17α,21-triol-3,20-dione which are potent, long-acting, anti-inflammatory agents and, concomitantly, exhibit little or no sodium retention.

The new and valuable esters may be represented by the following general formula:

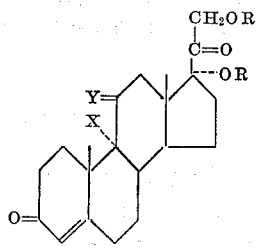

wherein X is a halogen having an atomic number less than 53; Y is a member of the group consisting of

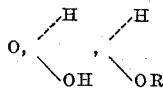

and R represents lower alkanoyl.

Cortisone and hydrocortisone and their 21-esters are known, highly active gluco-corticoids effective in the treatment of arthritis. It is known that the 9α-halo-, particularly the 9α-fluoro-, derivatives of the above mentioned hormones are also potent gluco-corticoids. The 9α-fluoro-analogues of cortisone and hydrocortisone are even more active as mineralo-corticoids, however, and thus cannot preferentially be used internally for anti-inflammatory therapy due to the resulting salt retention. Further, it is known that with compounds such as cortisone or hydrocortisone, acetylation of hydroxyl groups decreases the activities of the parent substance to a great extent, resulting in an inactive or therapeutically useless substance. Surprisingly, the compounds of this invention show a substantial reduction of sodium retention with a simultaneous enhancement of anti-inflammatory activity over that of their non-esterified, non-halogenated ester analogues. The halogenated esters of our invention have the advantage of having a superior duration of activity than their above-mentioned analogues. A further unusual feature in the case of the 9α-halogeno-mono-ene-triesters is that some of the manifold pharmacological activities of gluco-corticoids are also altered; e.g. eosinopenia and thymus involution have been severely decreased, leaving only a high level of anti-inflammatory action.

The compounds of our invention may be prepared by esterification methods such as with an acylating agent in the presence of an acid catalyst. In order to prepare the compounds containing an 11β-ester group, modification of the usual esterification methods must be employed. The polyhydroxy steroid is treated with an acylating agent such as acetic anhydride, isopropenyl acetate, propionic anhydride and the like, with a strong acid catalyst such as p-toluene sulfonic or trichloroacetic acid. These esterifications are carried out under otherwise mild conditions of temperature to avoid rearrangements and side reactions. The starting compound is preferably the corresponding unesterified or partially esterified 9α-halogenated-polyhydroxy steroid. For example, 9α-fluoro-4-pregnene-11β, 17α,21-triol-3,20-dione may be triacetylated at the 11,17-positions to yield the corresponding triester.

For esterification, lower alkanoic acids such as acetic, butyric, propionic, valeric, are preferred. However, we exclude only the stronger acids such as formic, trifluoroacetic, etc., which form extremely labile esters, which tend to easily hydrolyze even the hindered 11β-position. The esterification is catalyzed by any acid stronger than those having a $pK_A$ of 2, such as dichloroacetic, trifluoroacetic, sulfuric, phosphoric, methanesulfonic, p-toluenesulfonic, benzenesulfonic, hydrochloric and the like, but not those having oxidizing properties, such as nitric, chromic, periodic, and the like.

The following examples are illustrative of procedures for the preparation of the compounds of this invention, but are not intended to indicate the scope thereof, such scope being defined in the appended claims.

EXAMPLE 1

*9α-fluorocortisone 17α,21-diacetate*

A. 9α-FLUOROCORTISONE 17α,21-DIACETATE 3-ENOL-ACETATE

9α-fluorocortisone 21-acetate (2 g.) is suspended in 125 ml. of acetic acid and 125 ml. of acetic anhydride to which is added 1.25 g. of p-toluenesulfonic acid. The mixture is shaken until clear, and allowed to stand at room temperature for 48 hours. The mixture is then diluted with water, and extracted with methylene chloride. The methylene chloride solution is washed with dilute sodium bicarbonate to remove the acid, and then washed to neutrality with water, dried over anhydrous magnesium sulfate, filtered, and concentrated to a small volume in an air stream. This concentrate is chromatographed on activated magnesium silicate and the fractions eluted with 10% ether in hexane contain 9α-fluorocortisone 17α,21-diacetate 3-enolacetate. These fractions may be concentrated in an air stream, and the residues crystallized from acetone-hexane to yield 9α-fluorocortisone 17α,21-diacetate 3-enolacetate, λmax 235 mμ (MeOH) with inflections at 230 and 241 mμ.

B. 9α-FLUOROCORTISONE 17α,21-DIACETATE

The product from above Example 1A is dissolved in 20 ml. of 90% acetic acid and refluxed for 18 hours. The solution is then poured into water, neutralized with potassium bicarbonate, and extracted with methylene chloride. The organic layer is dried over anhydrous magnesium sulfate, filtered, and evaporated to a residue of 9α-fluorocortisone 17α,21-diacetate, λmax 239 mμ (MeOH) with no inflections. This product may be further purified by crystallization from acetone.

EXAMPLE 2

*9α-fluorohydrocortisone 11β,17α,21-triacetate*

A. 9α-FLUOROHYDROCORTISONE 11β,17α,21-TRIACETATE 3-ENOLACETATE

9α-fluorohydrocortisone is reacted with acetic acid and acetic anhydride in the presence of p-toluenesulfonic acid in the manner described in Example 1A to yield 9α-fluorohydrocortisone 11β,17α,21-triacetate 3-enolacetate.

B. 9α-FLUOROHYDROCORTISONE 11β,17α,21-TRIACETATE

The 3-enoltetraacetate of above Example 2A is reacted as described in Example 1B to yield the partially hydrolyzed product 9α-fluorohydrocortisone-11β,17α,21-triacetate, which is crystallized from acetone-hexane.

EXAMPLE 3

*9α-chlorohydrocortisone 11β,17α,21-triacetate*

A. 9α-CHLOROHYDROCORTISONE 11β,17α,21-TRIACETATE 3-ENOLACETATE

9α-chlorohydrocortisone 21-acetate is dissolved in 30 parts of 1:1 acetic anhydride-acetic acid to which is added 0.5 parts of p-toluenesulfonic acid. After standing four days at room temperature, the solution is washed with dilute sodium bicarbonate to remove acid, and then with water to neutrality. The solution is dried over anhydrous magnesium sulfate, filtered, and evaporated to dryness in an air stream. The residue is 9α-chlorohydrocortisone 11β,17α,21-triacetate 3-enolacetate.

B. 9α-CHLOROHYDROCORTISONE 11β,17α,21-TRIACETATE

The 3-enoltetraacetate of above Example 3A is dissolved in ten parts of 1:1 acetic acid-methanol and refluxed for eight hours. The solution is cooled and poured into water, then extracted with methylene chloride. The methylene chloride solution is washed with aqueous potassium bicarbonate until basic and then with water until neutral. The organic layer is dried over anhydrous magnesium sulfate, filtered, and evaporated in an air stream to dryness. The residue is taken up in a minimum amount of methylene chloride and chromatographed on a column of activated magnesium silicate, using hexane to develop the column. The fraction eluted with 30% ether in hexane is crystallized from acetone-hexane to give 9α-chlorohydrocortisone 11β,17α,21-triacetate.

EXAMPLE 4

*9α-fluorocortisone 17α-propionate 21-acetate*

A. 9α-FLUOROCORTISONE 17α-PROPIONATE 21-ACETATE 3-ENOLPROPIONATE

9α-fluorocortisone 21-acetate is dissolved in 30 parts of 5:1 propionic acid-propionic anhydride to which is added 0.15 parts of p-toluenesulfonic acid. After standing at room temperature for two days, the solution is treated as described in above Example 3A to isolate 9α-fluorocortisone 17α-propionate 21-acetate 3-enolpropionate.

B. 9α-FLUOROCORTISONE 17α-PROPIONATE 21-ACETATE

The 3-enolpropionate prepared as in above Example 4A is reacted in the manner of Example 3B. The fraction eluted with 1:1 ether-hexane is crystallized from acetone-hexane to give 9α-fluorocortisone 17α-propionate 21-acetate.

EXAMPLE 5

*9α-fluorohydrocortisone 17α,21-diacetate*

A. 9α-FLUOROHYDROCORTISONE 17α,21-DIACETATE 3-ENOLACETATE

9α-fluorohydrocortisone 21-acetate is dissolved in 5:1 acetic acid-acetic anhydride and 0.15 part of p-toluenesulfonic acid is added. The solution is allowed to stand for two days at room temperature, then is treated in the manner of Example 3A to yield a residue of 9α-fluorohydrocortisone 17α,21-diacetate 3-enolacetate.

B. 9α-FLUOROHYDROCORTISONE 17α,21-DIACETATE

The 3-enolacetate of above Example 5A, is hydrolyzed and the resultant product purified as described in Example 3B. The fraction eluted with 60:40 ether-hexane is crystallized from acetone to give 9α-fluorohydrocortisone 17α,21-diacetate.

EXAMPLE 6

*9α-fluorohydrocortisone 11β,17α,21-tricaproate*

A. 9α-FLUOROHYDROCORTISONE 11β,17α,21-TRICAPROATE 3-ENOLCAPROATE

9α-fluorohydrocortisone is dissolved in 25 volumes of 1:1 caproic anhydride-caproic acid and 0.5 part of methanesulfonic acid is added. After standing four days at room temperature, the solution is stirred in 5% hydrochloric acid for one-half hour, followed by extraction with methylene chloride, washing of the organic layer with dilute sodium bicarbonate and water, then concentration of the solution as described in Example 3A. The residue is 9α-fluorohydrocortisone 11β,17α,21-tricaproate 3-enolcaproate.

B. 9α-FLUOROHYDROCORTISONE 11β,17α,21-TRICAPROATE

The 3-enoltetracaproate prepared as in above Example 6A, is hydrolyzed selectively and the product purified by chromatography as in Example 3B. The fraction eluted with 20% ether in hexane is crystallized from acetone-hexane to give 9α-fluorohydrocortisone 11β-17α,21-tricaproate.

EXAMPLE 7

*9α-bromocortisone 17α,21-diacetate*

A. 9α-BROMOCORTISONE 17α,21-DIACETATE 3-ENOLACETATE

9α-bromocortisone 21-acetate in 1:5 acetic anhydride-acetic acid and 0.15 parts of p-toluenesulfonic acid is reacted as in Example 3A to yield 9α-bromocortisone 17α,21-diacetate 3-enolacetate.

B. 9α-BROMOCORTISONE 17α,21-DIACETATE

The 3-enolacetate of above Example 7A is hydrolyzed as in Example 3B, followed by chromatography. The residue of the fraction eluted with 1:1 ether-hexane is crystallized from methylene chloride-hexane to give 9α-bromocortisone 17α,21-diacetate.

We claim:
1. Compounds of the following general formula:

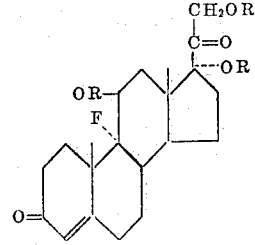

wherein R is a hydrocarbon lower alkanoic acid radical having from 2 to 6 carbon atoms.
2. 9α-fluorohydrocortisone 11β,17α,21-triacetate.
3. 9α-fluorohydrocortisone 11β,17α,21-tricaproate.

References Cited in the file of this patent
UNITED STATES PATENTS 2,781,369  Oliveto et al. _____ Feb. 12, 1957

FOREIGN PATENTS 750,330  Great Britain _____ June 13, 1956

OTHER REFERENCES

Fried et al.: J.A.C.S., vol. 75, pp. 2273–74 (1953).
Fried: J.A.C.S., vol. 76, 1954, p. 1455.